(12) United States Patent
Fabbricante et al.

(10) Patent No.: US 8,277,712 B2
(45) Date of Patent: Oct. 2, 2012

(54) FIBER AND NANOFIBER SPINNING METHOD

(75) Inventors: Anthony Fabbricante, Oyster Bay, NY (US); Jack S. Fabbricante, Medford, NY (US); Thomas J. Fabbricante, Lynbrook, NY (US)

(73) Assignee: SpinDynamics, Oyster Bay, NY (US)

( * ) Notice: Subject to any disclaimer, the term of this patent is extended or adjusted under 35 U.S.C. 154(b) by 41 days.

(21) Appl. No.: 12/976,366

(22) Filed: Dec. 22, 2010

(65) Prior Publication Data

US 2011/0089603 A1    Apr. 21, 2011

Related U.S. Application Data

(62) Division of application No. 11/635,839, filed on Dec. 8, 2006, now Pat. No. 7,857,608.

(51) Int. Cl.
*B29C 33/40* (2006.01)
*C03B 37/04* (2006.01)
*D01D 5/18* (2006.01)
*D01D 7/00* (2006.01)

(52) U.S. Cl. .................. 264/211.1; 65/470; 264/211.12; 264/219

(58) Field of Classification Search ........... 264/8, 211.1, 264/211.12, 219; 65/470
See application file for complete search history.

(56) References Cited

U.S. PATENT DOCUMENTS

| | | | | |
|---|---|---|---|---|
| 3,204,290 | A | * | 9/1965 | Crompton .................... 425/190 |
| 5,458,823 | A | * | 10/1995 | Perkins et al. ................... 264/8 |
| 5,939,120 | A | * | 8/1999 | Bogue et al. ................. 264/8 X |
| 2006/0228435 | A1 | * | 10/2006 | Andrady et al. ....... 264/211.1 X |

* cited by examiner

*Primary Examiner* — Leo B Tentoni
(74) *Attorney, Agent, or Firm* — George W. Moxon, II; Brian P. Harrod

(57) ABSTRACT

The present invention relates to a method for spinning fibers, or fiberizers, using a rotary fiber-making die system made up of thin plates, embodied by a housing fixture, configured and stacked to define slots, channels and/or grooves through which the material used to make the fibers will flow. The die system allows for the production of different size and types of fibers, including nanofibers having a diameter of less than 1 micron, and facilitates a variety of cost effective methods for extrusion. The use of plates means the dies can be manufactured cost effectively, with easier clean-outs, replacements and/or variations.

15 Claims, 9 Drawing Sheets

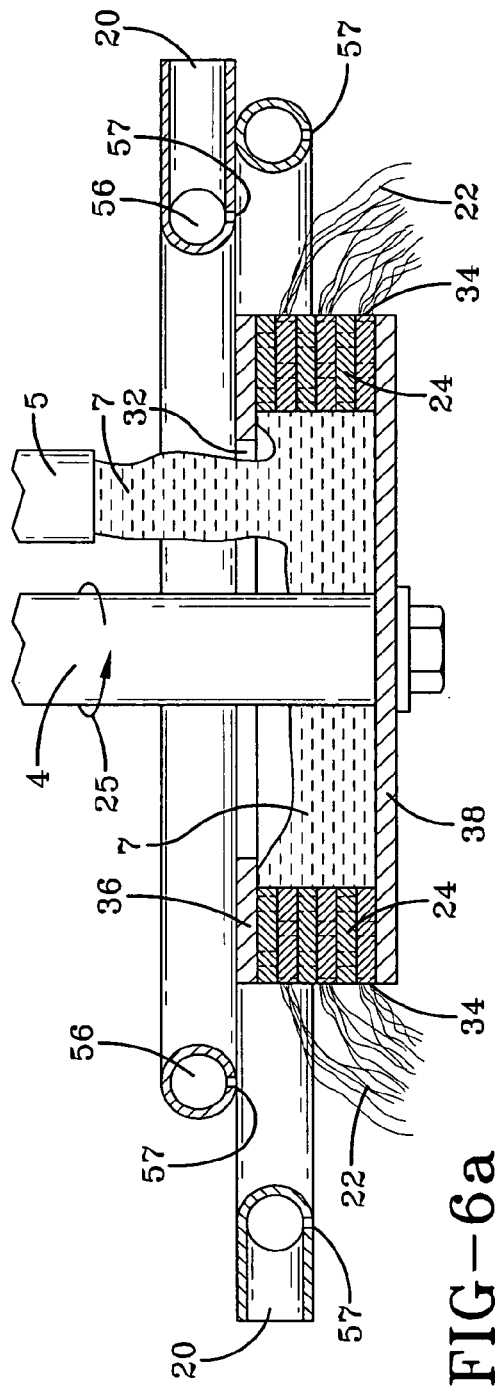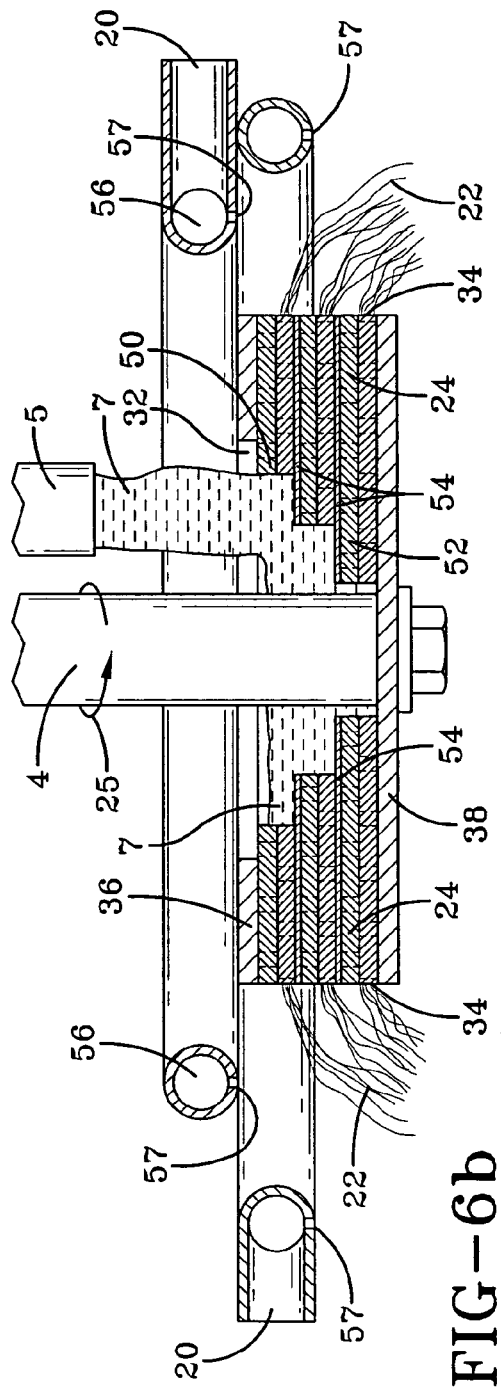

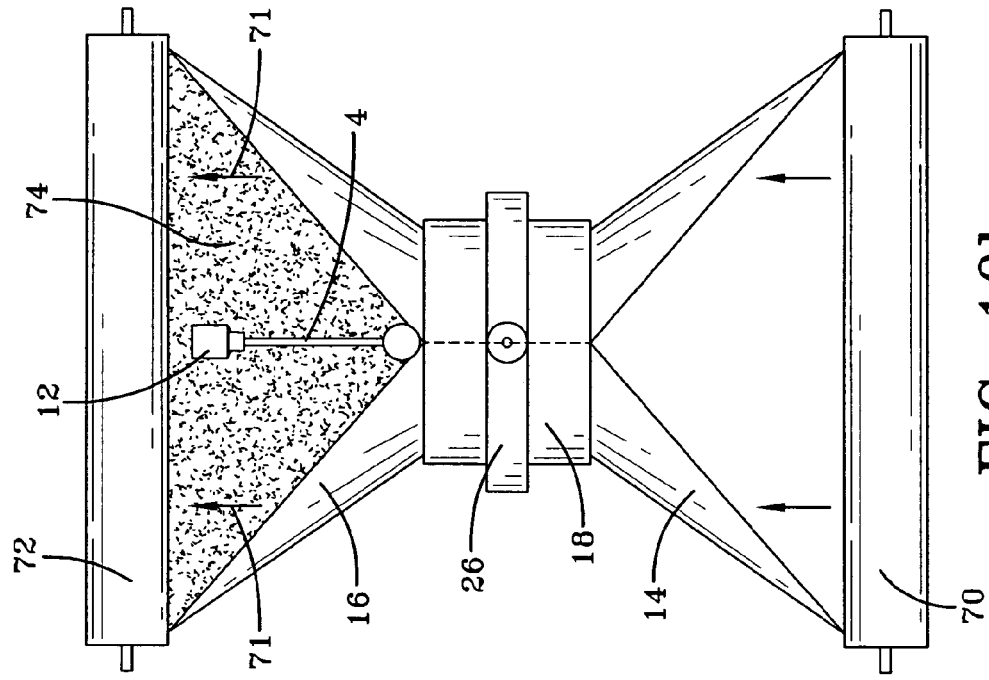
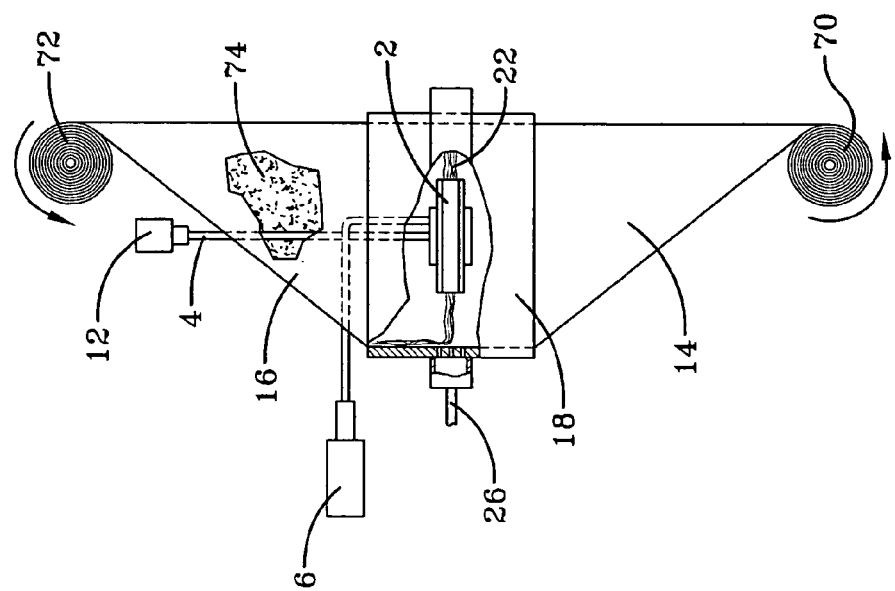

FIBER AND NANOFIBER SPINNING METHOD

CROSS-REFERENCE TO RELATED APPLICATIONS

This present application is a divisional of Non-Provisional patent application Ser. No. 11/635,839, filed on Dec. 8, 2006, which issued as U.S. Pat. No. 7,857,608 on Dec. 28, 2010, and which is incorporated herein by reference in its entirety.

BACKGROUND OF THE INVENTION

This invention relates to a method and an apparatus for spinning fibers, or fiberizers, using a rotary fiber-making die system made up of thin plates, embodied by a housing fixture, configured and stacked to define slots, channels and/or grooves through which the material used to make the fibers will flow. The die system allows for the production of different size and types of fibers, including nanofibers having a diameter of less than 1 micron, and facilitates a variety of cost effective methods for extrusion. The use of plates means the dies can be manufactured cost effectively, with easier cleanouts, replacements and/or variations.

Thermoplastic resins and glass have been extruded to form fibers and webs for many years. The nonwoven webs produced are commercially useful for many applications including diapers, feminine hygiene products, medical and protective garments, filters, geotextiles, insulation, ceiling tiles, battery separator media and the like. Larger glass-type fibers have been utilized in applications such as acoustical or thermal insulation materials. The common prior art methods for producing glass fiber insulation products involve producing glass fibers from a rotary process. A single molten glass composition is forced through the orifices in the outer wall of a centrifuge or spinner, producing primarily straight glass fibers. Curly glass fibers as taught in U.S. Pat. No. 2,998,620 to Stalego, which is incorporated herein by reference, discloses a bi-component glass composition to effect the curly end product.

A highly desirable characteristic of the fiber used to make nonwoven webs for certain applications is that they be as fine as possible, in some cases where fibers less than 1 micron are required. Fibers with small diameters, less than 10 microns, result in improved coverage with higher opacity. Small diameter fibers are also desirable since they permit the use of lower basis weights or grams per square meter of nonwoven. Lower basis weight, in turn, reduces the cost of products made from nonwovens. In filtration applications small diameter fibers create correspondingly small pores which increase the filtration efficiency of the nonwoven.

The most common of the polymer-to-nonwoven processes are the well known spunbound and meltblown processes. Some of the common principles between these two processes are the use of thermoplastic polymers extruded at high temperatures through small orifices to form filaments, using air to elongate the filaments and transport them to a moving collector screen where the fibers are coalesced into a fibrous web or nonwoven. The process chosen depends on the starting material and/or on the desired properties/applications of the resultant fibers.

In the typical spunbound process the fiber is substantially continuous in length and has a fiber diameter in the range of 20 to 80 microns. The meltblow process typically produces short, discontinuous fibers that have a fiber diameter of 2 to 6 microns.

Commercial meltblown processes as taught by U.S. Pat. No. 3,849,241, incorporated herein by reference, to Butin, et al., use polymer flows of 1 to 3 grams per hole per minute at extrusion pressures from 400 to 1000 psig and heated high velocity air streams developed from an air pressure source of 60 or more psig to elongate and fragment the extruded fiber. The typical meltblown die directs air flow from two opposed nozzles situated adjacent to the orifice such that they meet at an acute angle at a fixed distance below the polymer orifice exit. Depending on the air pressure and velocity and the polymer flow rate the resultant fibers can be discontinuous or substantially discontinuous.

U.S. Pat. Nos. 4,380,570, 5,476,616 and 5,645,790, incorporated herein by reference, all further detail the melt blowing process. More particularly, they detail improvements to melt blown spinnerettes counted on the surfaces of a polygonal melt-blowing extrusion die block thereby spinning fibers away from the center of the polygon at high extrusion rates. The fibers being deflected about 90 degrees by an air stream from a circular or polygonal air ring to enhance fiber entanglement and web formation.

Nonwoven webs as taught by Fabbricante et al. U.S. Pat. No. 6,114,017, which is incorporated herein by reference, are made by a meltblown process where the material is extruded through modular dies. The patent utilizes a series of stacked plates, each containing one or more rows of die tips. Each modular area being attached to a forced air mechanism to effect an extrusion. This produces a unique nonwoven web similar to Fabbricante et al. U.S. Pat. No. 5,679,379, which is incorporated herein by reference and which details an embodiment of die plates for fiber extrusion. Advantages mentioned by the modular die extrusion method being the efficiency of a quick change if a die became clogged or of using a lower cost material to effect a cost advantageous rapid cleanout/changeout.

Conventional melt spinning processes involve molten materials (typically a polymer and/or glass) being gravity fed or pumped under pressure to a spinning head and extruded from spinneret orifices into a multiplicity of continuous fibers. Melt spinning is only available for polymers (not including glass) having a melting point temperature less than its decomposition point temperature, such as nylon, polypropylene and the like whereby the polymer material can be melted and extruded to fiber form without decomposing. Other polymers, such as acrylics, cannot be melted without blackening and decomposing. Such polymers can be dissolved in a suitable solvent of typically 20% polymer and 80% solvent. In a wet solution spinning process, the solution is pumped, at room temperature, through the spinneret which is submerged in a bath of liquid (e.g. water) in which the solvent is soluble to solidify the polymeric fibers. It is also possible to dry spin the fibers into hot air, rather than a liquid bath, to evaporate the solvent and form a skin that coagulates. Other common spinning techniques are well known and do not form a critical part of the instant inventive concepts.

The area of fiber spinning frequently involved a spinneret made from a solid metal which is extrusion die cast or drilled to create openings or orifices from which the fibers are extruded. This presents limited options in the fiber spinning area due to a limitation on distribution/flow paths. A typical spinning method is disclosed in U.S. Pat. No. 5,785,996 to Snyder, which is incorporated herein by reference, and details a glass making invention with a spinning head comprised of drilled or machined holes to spin out the fibers. The fibers being aided in movement by the centrifugal force and/or by sending pressured air through the system.

After spinning, the fibers are commonly attenuated by withdrawing them from the spinning device at a faster speed than the extrusion speed, thereby producing fibers which are finer and, depending upon the polymer, possibly more crystalline in nature and thereby stronger. The fibers may be attenuated by melt blowing the fibers, that is, contacting the fibers as they emanate from the spinneret orifices with a fluid such as air. The air being under pressure to draw the same into fine fibers, commonly collected as an entangled web of fibers on a continuously moving surface, such as an internal or external conveyor belt or a drum surface, for subsequent processing.

The extruded fibrous web may be gathered into sheet, tube or roll form which may be pleated to increase the surface area for certain filtering applications. Alternatively, the web or fibers may be gathered together and passed through forming stations, such as calendaring rolls, steam treating and cooling stations, which may bond the fibers at their points of contact to form a continuous porous element defining a tortuous path for passage of a fluid material.

While earlier techniques and equipment for spinning fibers have commonly extruded one or more polymer materials directly through an array of spinneret orifices to produce a web of monocomponent fibers or a web of multicomponent fibers, recent developments incorporate a pack of disposable distribution or spin plates juxtaposed to each other, with distribution paths being either etched, grooved, scored, indented, laser cut or slotted into upstream and/or downstream surfaces of the plates to direct streams of one or more polymer materials to and through spinneret orifices at the distal end of the spinning system. Such a manner provides a reasonably inexpensive way to manufacture highly sophisticated spinning equipment and to produce a high density of continuous fibers formed of more than one polymeric material. As an example, a spinning fiberglass die lasts typically 100 hours in production, therefore reducing the cost of this production method will provide financial savings to the user.

One embodiment of current spinplate technology involves circular dies which are cast or drilled with a straight extrusion path. Control over these expensive dies is limited. Such a die is typically made from a block of steel which various channels and die tips required for directing flow of molten polymer are machined, cast or drilled. In order to reduce the degree of metal working needed, in many cases other machined blocks of steel are conjoined to the basic die body to carry the thermoplastic or other fluids required by the particular extrusion process. As extrusion dies grow larger and more complicated due to the use of multiple thermoplastic melts and drawing fluids, the complexity of machining increases geometrically as well as the costs for manufacturing the die.

Another factor adding to the costs of using such dies is the need for frequent cleaning of the residual carbonaceous matter created by the oxidation of the thermoplastics due to high temperature. This requires the availability of additional dies as spares. Dies also have limited life due to the erosion of the die tip tolerances due to the high temperatures and the wear of the fluids flowing through the dies under high pressures. An interchangeable and cost effective die which allows for a variety of configurations is desired in the art.

SUMMARY OF THE INVENTION

The present invention is directed to a fiber spinning device which incorporates a series of one or more thin plates configured and stacked to define slots, channels and/or grooves to create a path through which material flows to form the fibers. Thus, the stacked plates define the outflow (or die extrusion) edge of the spinning device. The plates can be stacked into the housing in a manner allowing for various configurations of flow paths, and are typically made from thin sheet, low cost materials allowing for a versatile and cost effective spinning method.

The present invention provides a fiber spinning device mountable to rotate on a shaft in a fiberizer comprising: one or more stacked, thin circular plates, a housing unit containing the one or more plates, at least one of the plates or the housing unit having a central opening to receive material to be formed into fibers, at least one of the plates having an outflow edge peripheral to the plate, the one or more plates and housing unit cooperating to form a chamber for receiving the fiber forming material and to allow the flow of material along a radial path whereby said outflow edge will define a spinneret orifice through which fibers can be extruded.

The present invention also provides a method of spinning fibers comprising the steps of: providing a material for use in forming fibers, providing a fiberizer with a spinneret capable of being spun about a shaft comprising one or more stacked, thin circular plates, providing a housing device containing the one or more plates, at least one of the plates or the housing unit having a central opening to receive material to be formed into fibers, at least one of the plates having an outflow edge peripheral to the plate, the one or more plates and housing unit cooperating to form a chamber for receiving the fiber forming material and to allow the flow of material along a radial path whereby the outflow edge will define a spinneret orifice through which fibers can be extruded, delivering the material to said spinneret with a rotating means, moving the material through said spinneret and utilizing the plates so as to define a distribution path, extruding the material via an outflow edge located on one of the plates and peripheral to the plate, and collecting the spun fibers.

The present invention also provides an apparatus for spinning fibers comprising: at least one source of fiber forming material, a spinneret comprising one or more stacked, thin circular plates, at least one of the plates having a central opening to receive material to be formed into fibers, at least one of the plates having an outflow edge peripheral to the plate, said plates cooperating to form a chamber for receiving the fiber forming material and to allow the flow of material along a radial path whereby said outflow edge will define a spinneret orifice through which fibers can be extruded, means for transporting fiber making material to the spinneret, means for axially rotating the spinneret where the rotating means is on the same axis as the central opening, and means for collecting and removing the fibers formed.

BRIEF DESCRIPTION OF THE DRAWINGS

FIG. 1a details a gravity fed supply means. FIG. 1b details a pressurized extruder type supply means.

FIG. 6 are two drawings of the spinning device with two different type spinning plates, FIG. 6a showing similarly stacked plates and FIG. 6b detailing separate concentric chambers of a stacked plate design;

FIGS. 10a and 10b are drawings of the takeaway means of the system, in which FIG. 10a is a side view, with part of it being broken away, and FIG. 10b is a top view.

DETAILED DESCRIPTION OF THE INVENTION

Figure 1A:
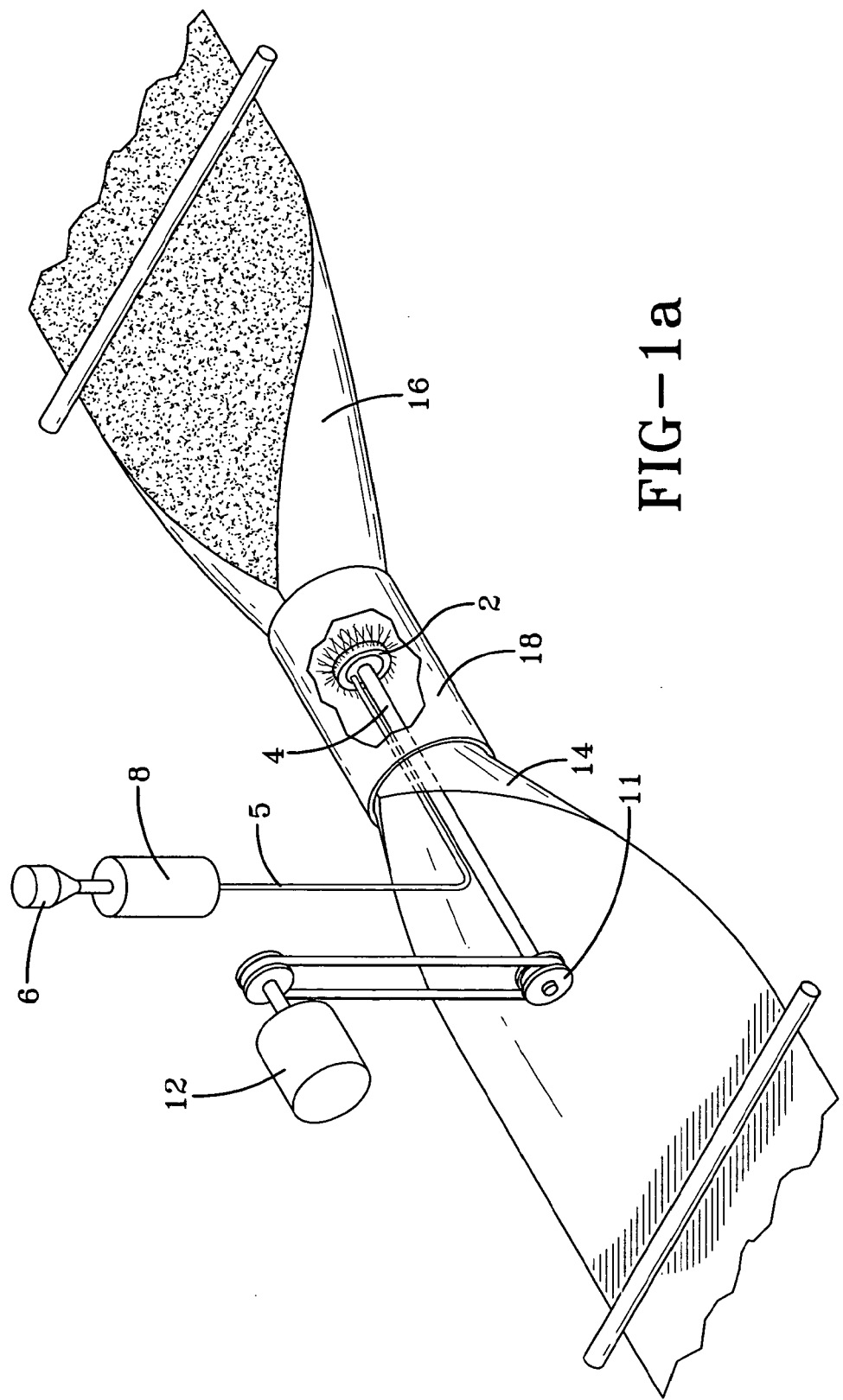
FIG. 1a and FIG. 1b are a drawing showing the supply means, the operation of the spinning apparatus and the takeaway means.

The present invention generally relates to an apparatus for extruding and spinning fibers and relates more particularly to the production of a homogeneous web of fibers. The plate configuration on the apparatus is of particular importance, as it allows production of nanofibers and other larger fibers by centrifugal force. The stacked, thin plates and the interchangeability of these plates, along with the variations of slots, holes or grooves for extrusion of fluid materials is novel to the art of spinning fibers. The device operates by stacking the plates and allowing a serpentine flow for an even, uniform pressure balance and improved fluid distribution. Stacked, "bridged" plates with small serpentine flow throughways can also be strategically constructed as built-in filters to material passing through the plates. The interchangeability aspects of the plates allows for a variety of configurations to be employed. These variations include, but are not limited to, changing the size of the extrusion, changing the RPM speed of the spinning head/shaft, altering the fiber diameter, altering the volume of the extrusion, varying the pressure of the device, or varying the temperature extrusion. For the purpose of this invention a fiberizer is known by its common term in the art, that being a device which produces fibers.

The present invention allows a variety of flow patterns/distribution paths. This pattern/path can be easily altered by changing the spinning plate configuration, whereas the prior art die method does not easily allow changes due to the complexities and costs in manufacturing such a setup. Particularly with serpentine flow, stacked plate assemblies, through conventional milling and drilling would be impossible to machine.

The plates of the device are easily separated to allow cleaning of the extrusion path if clogging occurs during use. As the material moves through the extrusion channel or slots, the plates and/or spacers allow for cleaning by removal of the plates. This cleaning may be required during normal operation, or may be needed during temperature variations if the feed material did not melt/process as expected. Such a method provides a more cost effective and easier clean out method than conventional dies. If a situation exists where wear is high, a disposable plate or module assembly may be a viable alternative. A likely candidate for this type of module would be an extrusion in an abrasive environment. Utilizing a low cost material and a low cost method for creating the module, several spinning plate combinations could be preassembled. As the plates become clogged or wear out, the module is simply discarded; minimizing the amount of time the system is down for turnaround/production.

Another benefit of the invention is the use of slots or grooves as the passage channel, canal, or distribution path. Such a setup is unique to the field, with no known art employing a spinning device with slots/grooves. The current state of the art involves mechanical stamping, and/or electrical discharged machine (EDM) slots and/or grooves being etched/cut from a laser or other applicable device. One advantage of the plate method over the current state of the art is that the plates of the invention may allow for serpentine flow patterns. Utilizing a series of stacked plates or a series of offset plates allows a user the ability to create varied flow patterns in the distribution channel. Such patterns yield better fluid distribution and pressure balance.

As stated prior, the spinning method of the invention utilizes stacked plates versus standard milled and/or drilled dies from "start-up" block, steel components. The invention provides a spinning head which is lower in cost and offers much faster delivery of material to the fiber nonwoven web production. The invention also allows more circumferential orifices per linear inch as the stack/height varies and allows for more versatility of orifice sizes, for more interchangeability and the ability to withstand high pressure. With this invention, there is no limitation regarding plate thickness, slot size, groove size or stack height.

Referring now to the drawings, FIG. 1a details a drawing of the spinning apparatus and takeaway means. The main part of the apparatus comprising a spinning head 2, detailed in FIG. 1a. The head operates by rotating about a cylindrical shaft 4, as material is gravity fed in a supply means 5 next to the shaft 4, the material enters the spinning head 2 and is centrifugally forced to the edge, allowing for an extrusion of the material at various diameters of said spinning head 2. The unit is kept under a constant temperature by a heating device located on the source material storage area 6, or the extruder 8, with heat being used to allow for proper flow of the material. The flow of material in this embodiment is typically by gravity feed only as low or atmospheric pressure is used. A driving pulley 11 or similar system, and a rotation motor 12, detail the rotational means which creates the centrifugal force for the process. The rotational motor 12 can be variable to allow for different flow rates of material. In addition various types of centrifugal device can be utilized.

FIG. 1a details the substrate take away means 14 which can be a continuous belt carrier where fiber is sprayed or discharged onto the belt, removed from the belt and wound into a roll, or can be fibers sprayed or discharged onto a substrate carrier and wound, or can be downstream fibers from another source such as meltblown, spunbound or spunlaced acting as a carrier. The substrate take away means 14 in FIG. 1a does not include the fiber web, as the web is added after passing the spinning head 2. After passing the spinning head, the substrate take away means 16 carries the final web product.

Figure 1B:
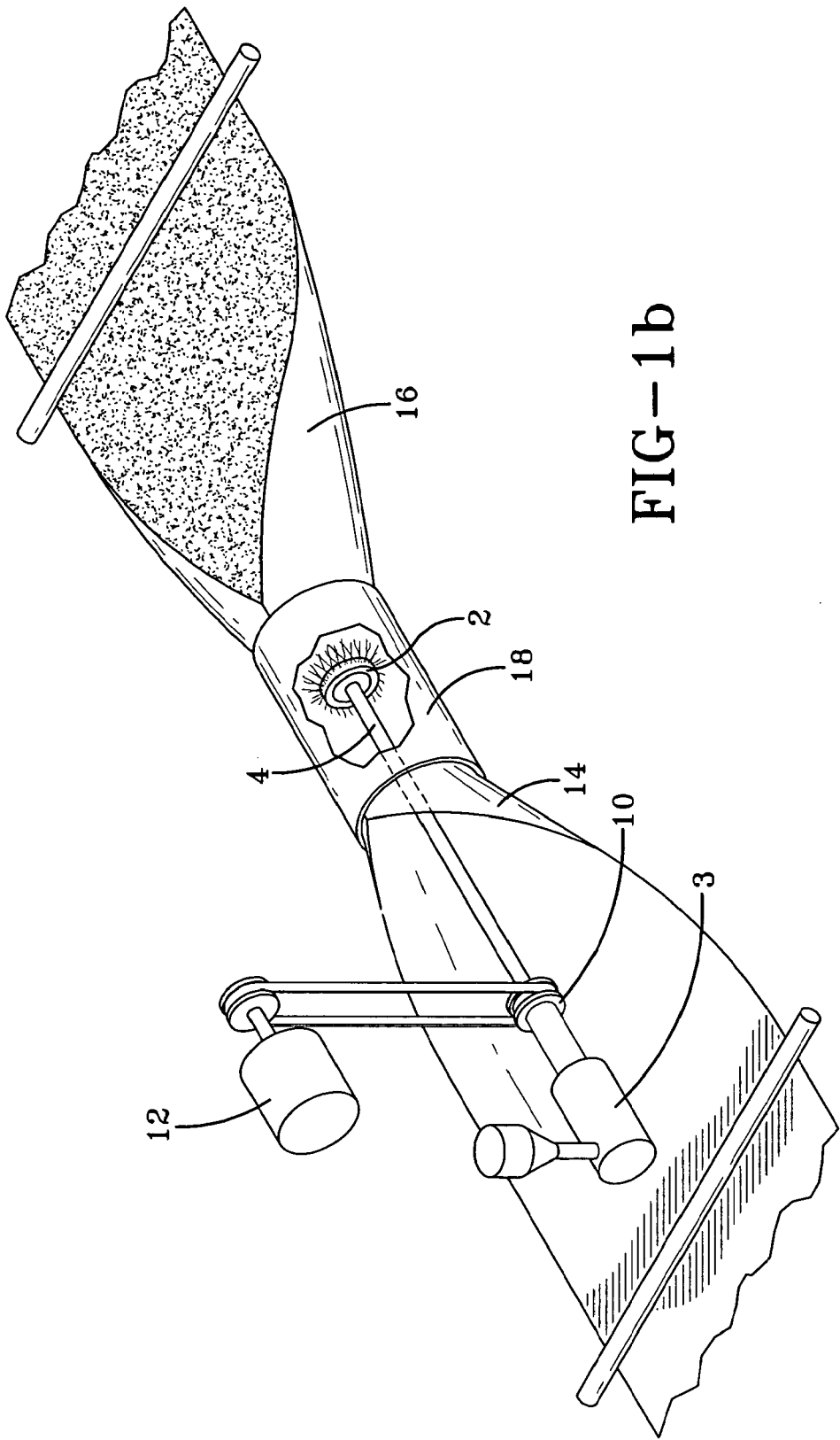

FIG. 1b details the same apparatus as FIG. 1a, with an alternate configuration for the material supply means. The material can also be fed under pressure from an extruder 3. The material flows from the extruder 3, to a rotary flange 10. The rotary flange 10 attached to the extruder 3, and the shaft 4. The rotary flange 10, being a flow through flange having two flanges combined. One flange being stationary, and attached to the extruder 3, the other being rotational and attached by a means to the rotational motor 12. The shaft 4, in this example having an inner chamber to allow the flow of fluid therein. The rotational motor 12 can be variable to allow for different flow rates of material. The utilization of the gravity feed system of FIG. 1a and the pressurized extrusion system of FIG. 1b is dependent on the application. The two embodiments are readily interchangeable means of delivering the material to the spinning plates.

The spinning head 2, has at least one circular plate. The spinning head 2 typically consists of a housing device which contains at least one circular plate. The plate(s) being stamped, machined, etched, scored, laser cut, or indented into a path to which material can flow. At the plate edges, openings are created to allow the material to be delivered to the substrate takeaway means 16 and create the fiber web. An opening can be a full plate thickness opening through which the material can pass, or can be a partial plate thickness opening. Such a partial opening can be stamped, machined, etched, scored, laser cut or indented into the surface. The partial opening can be on one or both sides of the plate. The use of the partial or full opening is determined based on the application. The spinning head 2, contains the plates and also is the area wherein the extrusion occurs. The substrate takeaway 16 allowing for extruded material to be eventually wound into a roll or other storage means. The fibers are centrifugally extruded from the spinning head 2, onto the substrate takeaway means setup 14. The substrate takeaway means 16, is the mode/method onto which the fiber web is blown, extruded, gravity fed or pulled by vacuum onto a takeaway means. In order to adequately move the materials, a forming tube 18, forms the substrate into a cylinder near the spinning head 2. The forming tube 18, forms the substrate and/or the takeaway belt into a cylinder, and from there the fibers are spun onto the belt/substrate 14.

Figure 2:
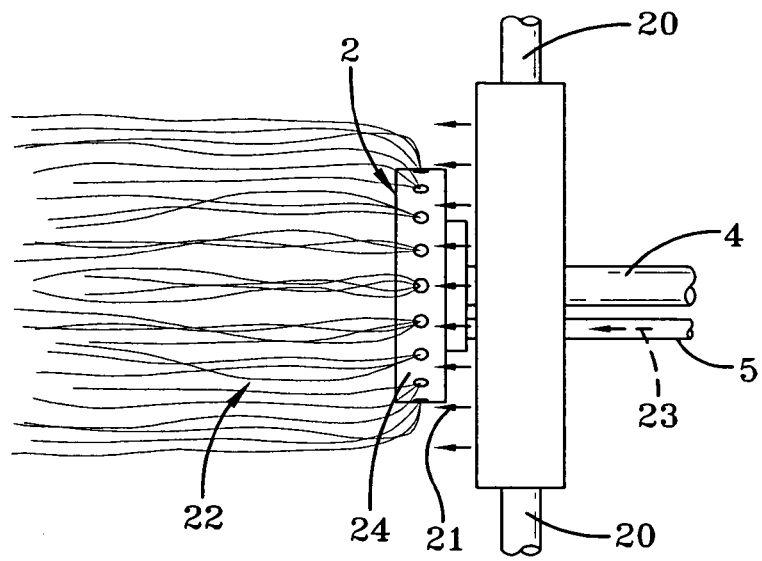
FIG. 2 is a drawing detailing the internal workings of the spinning apparatus with gas being blown at a high velocity, attenuating the fibers as they exit the spinning head.
Figure 3:
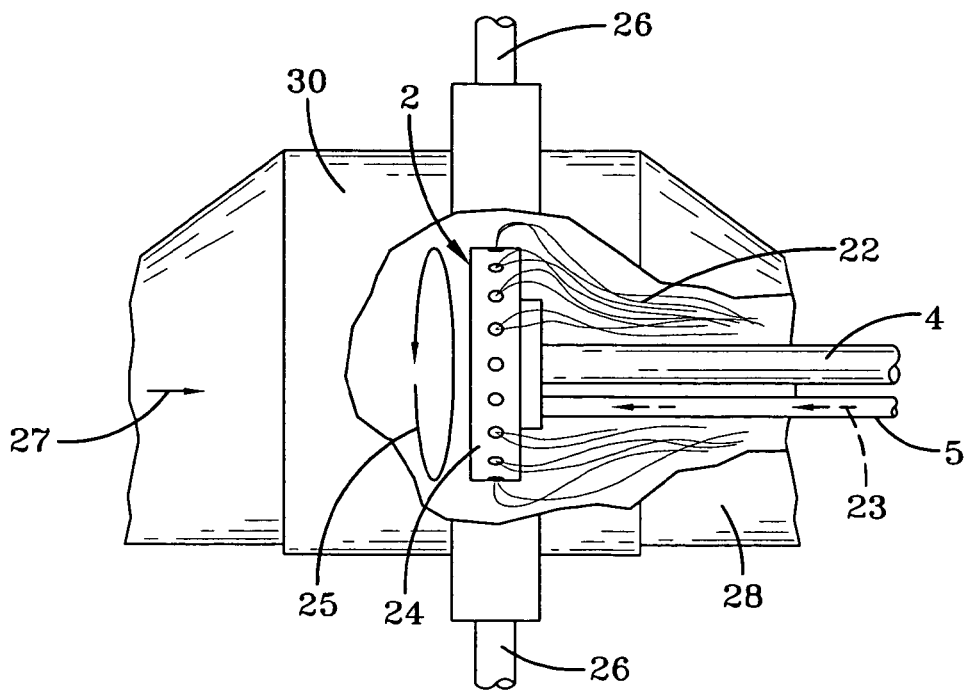
FIG. 3 is a drawing detailing the internal working of the spinning apparatus with a suction or vacuum method drawing the fibers exiting the spinning head onto a substrate.

FIGS. 2 and 3 detail the internal workings of the spinning apparatus. FIGS. 2 and 3 detail the central location of the plates, and shows material moving through the supply means 5, along the shaft area 4, and eventually into the center of the plate. From there centrifugal force 25, moves the material from the center area through the plate to the outer edge and eventually to an extruder type opening on the outflow edge. The material exits the spinning device via this opening. From the opening, a takeaway means delivers the material to its final location.

FIG. 2 details the current state of the art for fiber blowing, such a means is used in fiberglass blowing. In FIG. 2 higher velocity gases are blown into the center of the spinning head 2. The gases approach the spinning head via a gas inlet 20. This high velocity gas 21, aids in moving the material thru the device, to the outflow edge and onto the substrate carrier. The fibers 22, are attenuated as they exit the spinning head 2 and specifically the stacked plates 24 of the spinning head 2. This high velocity gas 21 action creating a flow pattern which the fibers 22, follow. The velocity of the gas may vary as needed. In this embodiment the direction of material flow 23, through the supply means 5, is in the same direction 21, as the direction of flow of the attenuated fibers.

FIG. 3 details an embodiment of the apparatus employing a vacuum/suction device. The device is mounted so as to draw air away from the unit housing the spinning device 2 and plates 24. The drawing of this air thru the outlets 26, creates a flow which draws the fibers 22 outward onto the takeaway means 28. FIG. 3 shows the takeaway means 28 as being a substrate device which carries the fibers 22 to the final storage location. The takeaway means 28, operating in the opposite direction 27, of the material flow 23, from the supply means in this embodiment. Also, FIG. 3 details the tube 30 device which is created by the substrate carrier. Here the tube 30 constricts down in a circular manner around the spinning head 2. The vacuum from the outlets 26, causes the material to draw away from the outflow edge of the spinning plates 24 and onto the takeaway means 28 created by the support tube 30.

Figure 4:
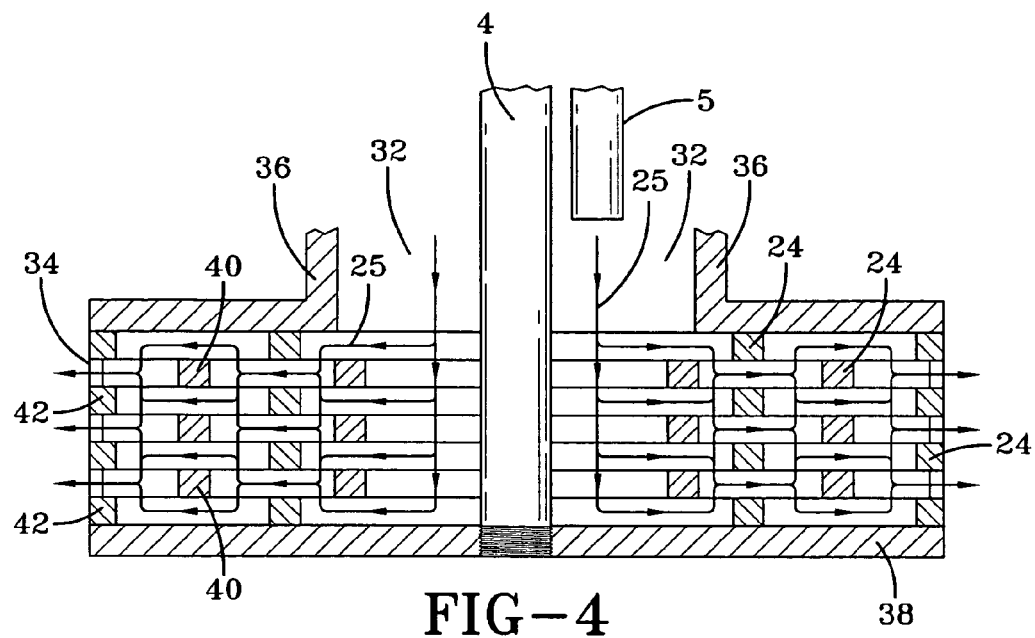
FIG. 4 is a drawing detailing the serpentine flow pattern effected by stacking the plates, the material flowing from the central opening to the outflow edges.

FIG. 4 details the stacked plates 24 used in the spinning apparatus. Two different types of plates are used in this embodiment, a fiber making plate 40, and a spacer plate 42. In most embodiments the plates are stacked in an alternating manner with a spacer plate 42, next to a fiber making plate 40. This process being repeated as needed. However, another embodiment involves the use of two fiber-making plates with each plate doubling as a spacer plate or the offsetting of two fiber making plates to effect a divergent flow pattern.

Also detailed in FIG. 4 is the flow pattern involved in one embodiment of the invention. As the material leaves the storage area and extruder the material travels through the supply means 5, along the shaft 4, the material entering a central cavity or central opening 32, located directly adjacent the shaft 4. The material travels from the central opening 32 and by centrifugal force 25, is drawn into the spinning plates 24. The material being drawn from the center of the spinning plates 24, 40, 42 to the outer edge. At the outermost edge of the spinning plates 24 is an outflow edge 34. Such an outflow edge 34, being an opening through which the material exits and becomes a fiber and/or nanofiber.

The spinning plates 24 are attached to the shaft 4 by the plate holder device 36. The plate holder device 36 encasing the spinning plates and rotating with the unit. At the end opposite the rotational shaft 4 is a plate holder end cap housing 38. The end cap housing being a solid plate which prevents further flow of material and forces the material to exit via the outflow edge 34. The plate holder device 36 and plate holder end cap housing 38 are also known collectively as a housing unit. Typically the material used in constructing the plate holder device 36 and end cap 38 (or housing unit), is thicker than the spinning plates 24. This allows for higher pressures in the apparatus.

Figure 5:
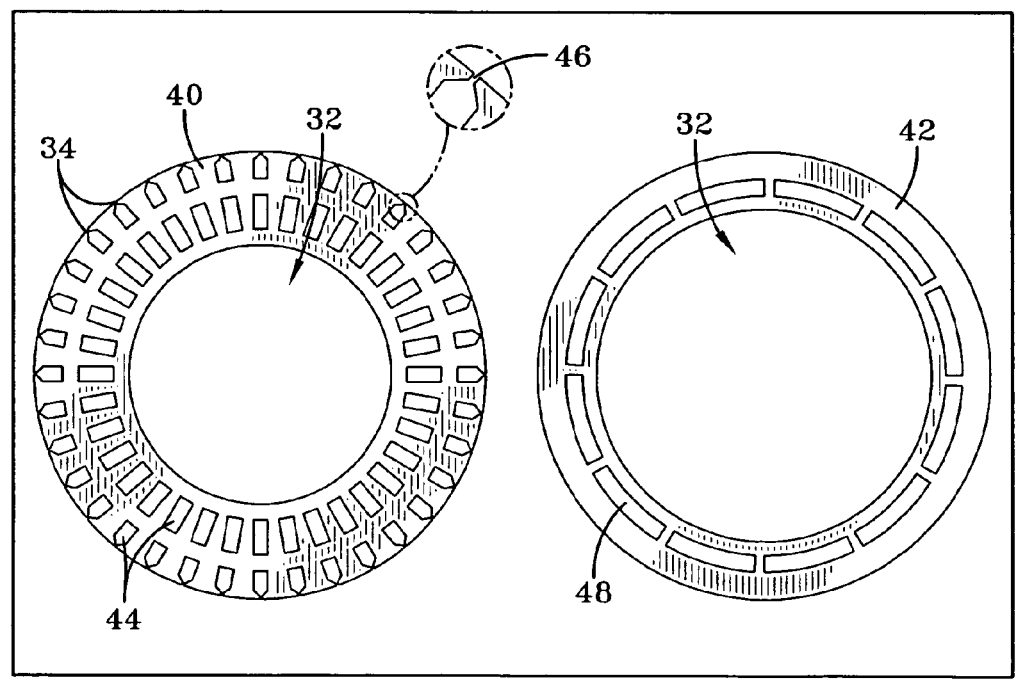
FIG. 5 is a drawing of a fiber making plate and a space plate similar to those used in FIG. 4.

The spinning plates 24 are further defined in FIG. 5 as fiber making plates 40 or as spacer plates 42. The fiber making plates 40 and spacer plates 42 are typically derived from stamped, machined, laser cut, etched, scored, indented or electrical discharged machining methods. In cases where the alteration does not go though the entire thickness of the plate the fiber making plates 40 and spacer plates 42 may be marked or altered on either one or both sides of the plate. The fiber making plate 40 is circular with a center hole or central opening 32. The center hole 32 allowing for material to be continually fed from the supply means 5. The fiber making plate 40, typically has a series of holes or slots 44 radiating from or near the center hole 32 to the outflow edge 34. These orifices, holes or slots 44 can be slotted, etched, laser cut, scored, indented or electrical discharge machined. The profile of this orifice can be square, rectangular, round, slotted, half round or triangular "V" grooved. The orifices 44 are configured in various manners to allow varied configurations of the fiber web. Variations on the orifices 44 allow for varying qualities, quantities and distribution of fibers in the web. The size of the orifice varies with dimensions as small as 0.0005" by 0.0005". The number of the orifices 44 per linear inch varies with each application but can be from 1 to 300 orifices per circumferential inch. In applications where the orifices are small enough and placed close together there can be up to 660 orifices per linear inch. In order to achieve this value the orifices must be as small as 0.0005" wide by 0.0005" deep and must be spaced 0.001" apart. When employed in combination, a variety of plates with differing orifice sizes and orifice numbers can be used. Also the spacing is specific to the application in question.

As stated previously, the orifices 44 radiate outward to an outflow edge 34. The outflow edge 34 allows for the escape or extrusion of material from the spinning head 2 and into the take away means 28. The outflow edge 34 typically employs a concentric tip 46. Such a concentric tip 46 is made by mechanical, chemical or electrical methods.

The spacer plate 42 in FIG. 5 typically has less area than the fiber making plate 40, as the purpose is to effect a diversion in the normal flow path of the material. The material following a distribution path altered by the insertion of varying spacer plates 42, offset fiber making plates 40 or differently configured fiber making plates 40. The spacer plates 42 are typically manufactured by stamped, machined, laser cut, etched or electrical discharged machining methods. If fluid passageways or distribution channels 48 are needed in the spacer plates 42, these channels can be made by slotted, etched, laser cut, scored or indentation methods and can be square, rectangular, slotted, round, half round or triangular "V" grooves.

The thickness of the fiber making plate 40, and the spacer plate 42, will vary, but in one embodiment the thickness was between 0.0005" and 0.1". In another embodiment the thickness of these plates varied between 0.001" and 0.1". For the purposes of this application, the term "thin" is intended to mean plates having a thickness of between about 0.0005 inch and 0.1 inch. The plates themselves are typically made from ferrous or non-ferrous metals but can also be made from plastic, ceramic, inconel or any other suitable materials. Advantages provided by the use of a ceramic plates involves less wear and the ability to withstand higher temperatures. When combining plates a variety of thicknesses can be used as it is not necessary to use one standard plate thickness. The distribution path created by these plates will vary based on the application but can be as low as 0.010" long and 0.0005" deep by 0.0005" wide.

The plates, as detailed in FIG. 4 and FIG. 6 are stacked with the shaft 4, of the apparatus passing thru the central opening 32, of the spinning plates 24. The shaft 4, rotates and creates a centrifugal force 25, moving the material 7, from the supply means 5, into the chamber created by the central opening 32. The material is transported into the spinning plates 24, through the plates, through the outflow edge 34, and then outside the apparatus to the takeaway means 28. The fiber is aided onto the takeaway means by either a vacuum draw, centrifugal means or a high velocity gas. The high velocity gas introduced into the system via the gas inlet 20 at the side of the apparatus. The high velocity gas in one embodiment encircling the spinning plates in a halo or ring 56. The gas flowing from the ring 56 attenuating the fibers into a free fall onto the takeaway means. The gas exiting the halo ring 56 via a narrow opening 57.

As shown in FIG. 4 the distribution path created by the plates can be, but is not limited to, a serpentine path. Such a path is achieved by the stacking of dissimilar plates 40, 42, or by offsetting similar plates. These methods creating a variety of plate, path and flow configurations allowing for variations of the fiber diameter, fiber strength and/or configuration in the fiber web. In a serpentine setup the pressure is more uniform and the plates can also be strategically constructed to act as a filter for material. One goal of plate arrangement involves improved fluid distribution and pressure balance. In one embodiment the plates are held together by a series of bolts, however any suitable fastening means can be used as a securing means. One such fastening means includes a narrow top to bottom strip weld of the stacked plates. The plate arrangement 24 is secured in the plate holder device 36 to the end cap housing plate 38. The end cap housing plate 38 prohibiting further flow of the material thru the center channel and in essence forcing the material to the outflow edges 34. The housing unit 36, 38 thicknesses varying depending upon the temperature and pressure application requirement.

The mechanism to spin the fibers has a speed which can vary from 50 to 20,000 revolutions per minute. Varying the speed of this device 12, or a similar device will affect the amount/qualities/diameters of the resultant fiber. Also changing the fluid viscosity, via the heater or by changing chemical/flow properties of the source material will affect the fiber amount/qualities/diameters.

The basic setup for the spinning plate 24 arrangement is for similar sized plates to be stacked on top of one another, such a configuration is detailed in FIG. 6a. Another embodiment of the fibermaking plates involves a stacked/stepped configuration, as shown in FIG. 6b. This embodiment involves changing the size of the inner diameter of the center opening 32. The center opening 32 of the plates at the material entry end 50 would be wider than the center opening 32 of the plates at the top or end-cap end 52. Moving from the material entry end 50, to the end cap end 52, the central opening 32 of the plates 24 becomes progressively smaller. The largest diameter center opening 32 would be near the opening/entry end 50, channeling/stepping down to the smallest inner diameter opening 32 at the end cap 38 or end furthest from the entry end 52. Such a setup would incorporate a blocking plate 54. The blocking plate 54 being a solid plate of the same diameter of the adjacent plate. The blocking plate 54 prohibits the flow of material through the plate and in essence creates separate zones of extrusion. Such an apparatus would allow better pressure distribution and flow through the fiber making system. For example, one embodiment is a series of plates 24 with an inner diameter for the central opening 32, of 15" near the entry end 50. Immediately adjacent to these plates would be a series of plates 24 with a 14" inner diameter for the central opening 32, and immediately adjacent to this would be a series of plates 24 with a 13" inner diameter for the central opening 32. Here each level is dedicated to extruding the material, but the pressure distribution and flow improves versus a standard straight flow channel.

Figure 7:
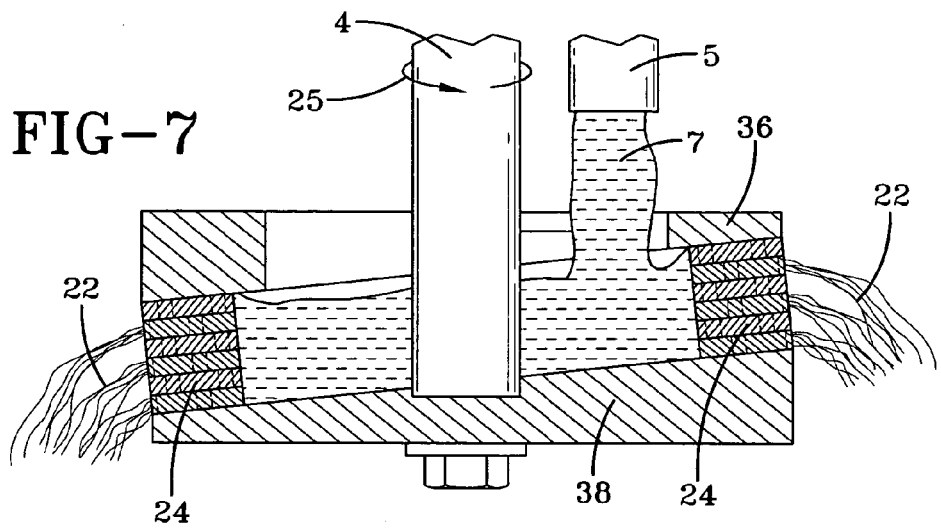
FIG. 7 is a drawing of the spinning plates tilted at an angle from the axis of rotation.

The angle of the spinning plates 24 in the module is typically at a 90 degree angle to the rotational shaft 4. However, as shown in FIG. 7, in order to create a variation in the lay down of the fibers 22, the angle of the spinning plates 24 can be altered from 0.1 to 20 degrees from this typical position, i.e. being at a 70 to 89.9 degree angle to the rotational shaft 4. Such an alteration creates a wider spread of fibers 22, and allows the take away system to run at a faster rate than a standard 90 degree angle rotating member take away speed.

Figure 8:
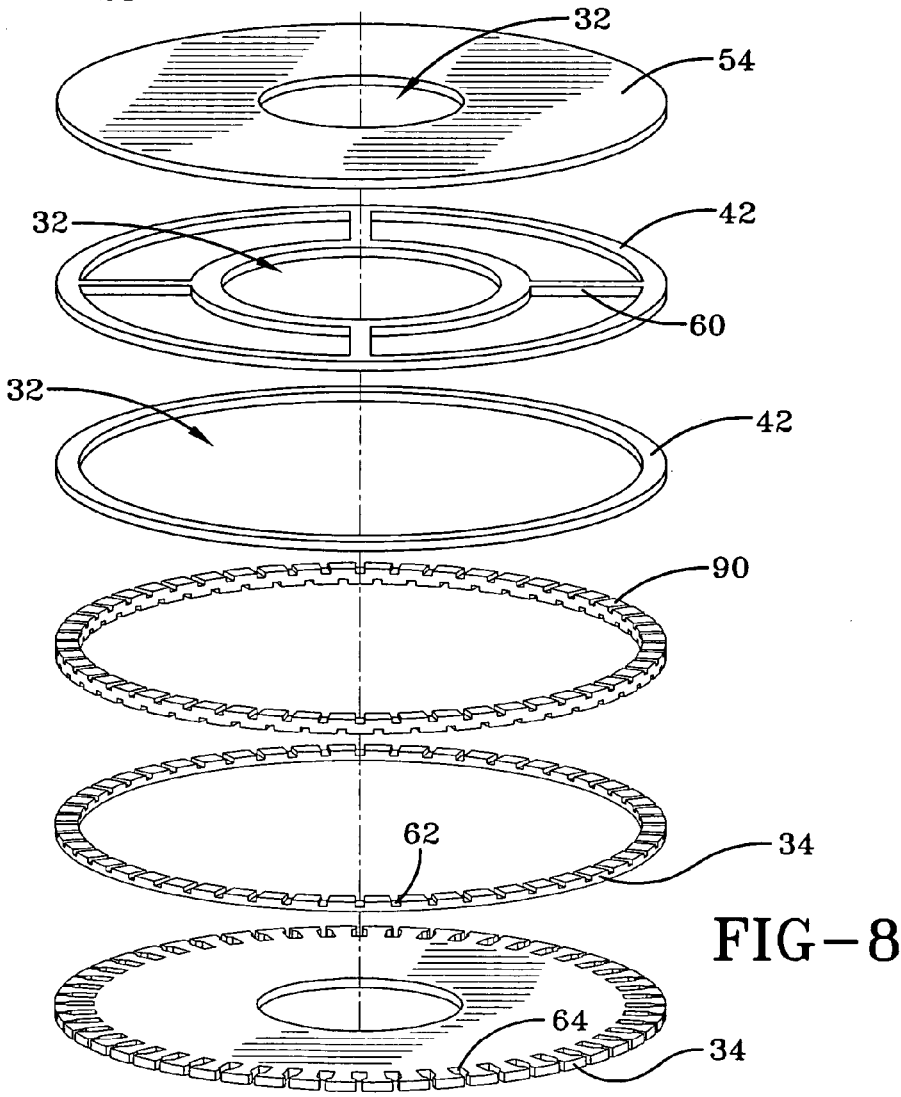
FIG. 8 is a drawing showing various plates used.

Various types of plates are used to achieve different purposes. FIG. 8 details the various types of plates which can be used to effect the final product. A chamber separator plate, or blocking plate 54 is used to separate zones of flow from one another. Such a plate is solid and allows passage of material only through its central opening 32. Such a plate is useful in a stepped type system as shown in FIG. 7. A spacer plate 42 can have a variety of configurations as shown in FIG. 8 such as a plate with support tie bars 60. Either setup allowing for space to be placed between adjacent plates. Each plate allowing for passage of fluid via the central opening 32. Finally the plate setup must include plates with an outflow edge 34. Such an edge can occur on a plate having single-face channel grooves 62, double faced channel grooves 90 or can be slotted 64.

Figure 9:
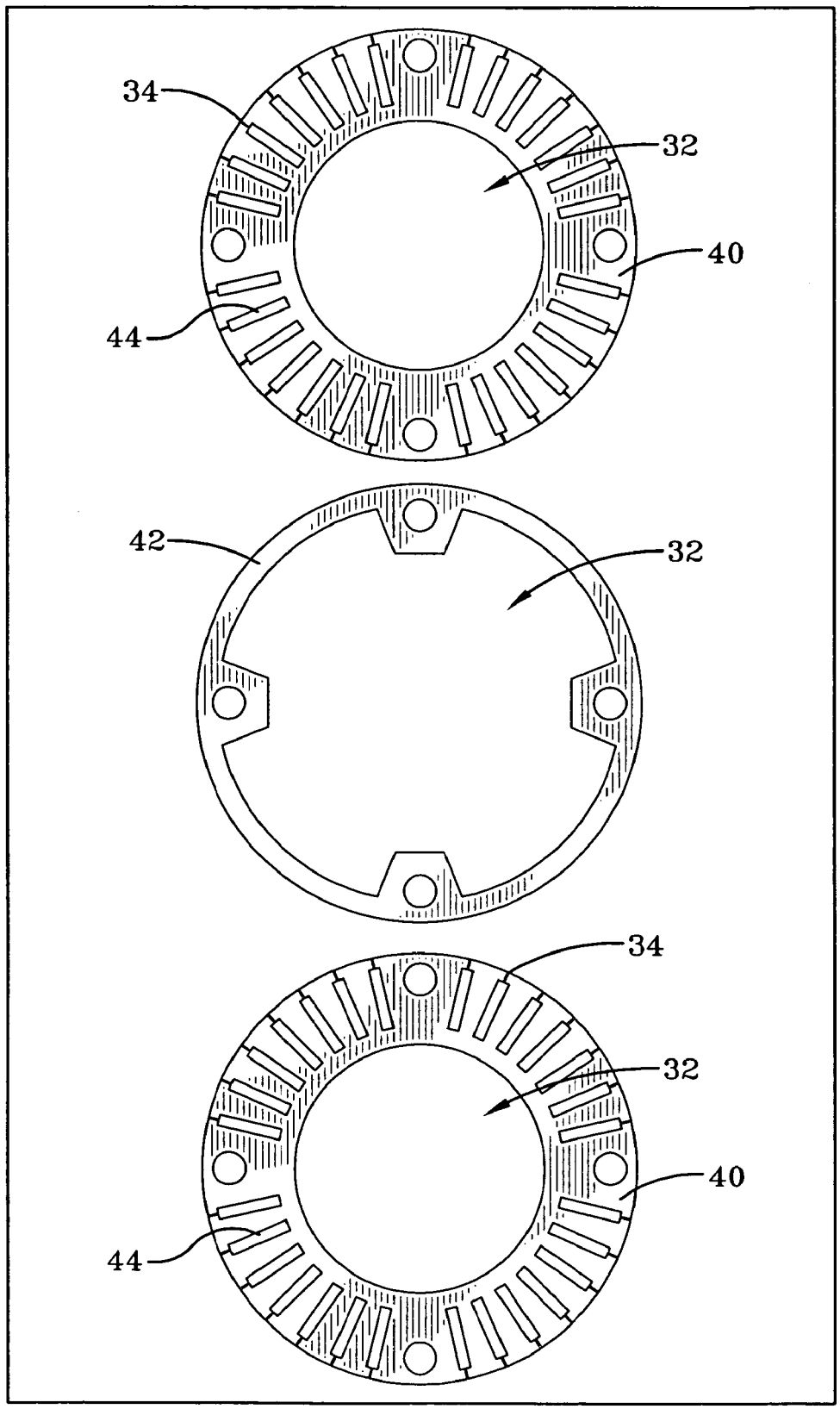
FIG. 9 is a drawing of one embodiment of the plate design detailing two fiber making plates and a spacer plate.

FIG. 9 details another embodiment of the spinning plates 24. In this configuration two fiber making plates 40 are shown with a spacer plate 42. The central opening 32 or paths for material flow can be seen in both the top and bottom plates. One embodiment of the invention involves making the spinning plates 24 from a low cost or disposable material. This would allow frequent changes of the spinning plates 24 in areas where the device is prone to clogging and for applications where changing the plate would be quicker or more cost effective than a cleanout. The plates utilize a channel or a slotted configuration as an outflow edge 34. The plates detailed in this and other embodiments can be aligned or offset as warranted by the application and final product.

Alternate embodiments of the spinning plate configurations are possible. One option is for openings/orifices to be rectangular, square, triangular, and/or round. Another option allows the user to vary the different number of plates. Another option is to separate the plates by one, two or more spacer plates, the preferred embodiment involving a spacer plate alternating with a fiber making plate. Every embodiment requires an end cap plate 38. Such a plate being solid and preventing flow of material through. The entire apparatus being secured into a plate holder device 36 which secures the various plates together.

FIGS. 10a and 10b detail an embodiment of the collection system take-away means. The drawing details a belt or conveyor substrate 14 which accepts the fiber material and transports it away 71, from the spinning head 2. The fiber 22 is sprayed, vacuum assisted, blown or drawn onto the substrate 14, 16. The substrate 14 being passed near the spinning head 2 and then taken away for storage. The speed and tension at which this takeaway occurs is important, as variations can affect the quality and tensile properties of the fiber. A supply roll 70 of substrate material such as a polyester, polypropylene or any suitable carrier material allowing the fiber/nanofiber the ability to form a nonwoven web to bond, or easily release is needed. This supply roll passes near the spinning head 2, is kept at a constant diameter at the forming tube 18, which can remain in a tube form or can be mechanically or electrically slit to open and then taken to a rollup or storage roll 72.

FIG. 10b defines the conical nature of the takeaway with the perspective shown in FIG. 10a being a side view. FIG. 10b details the takeaway means 16 and substrate carrier 14, expanding into a flat apparatus allowing the fiber mesh to create a web-like sheet 74. Such takeaway means 16, can be, but are not limited to, a method of blowing the fibers or a method that can be pulled under a vacuum.

Figure 11:
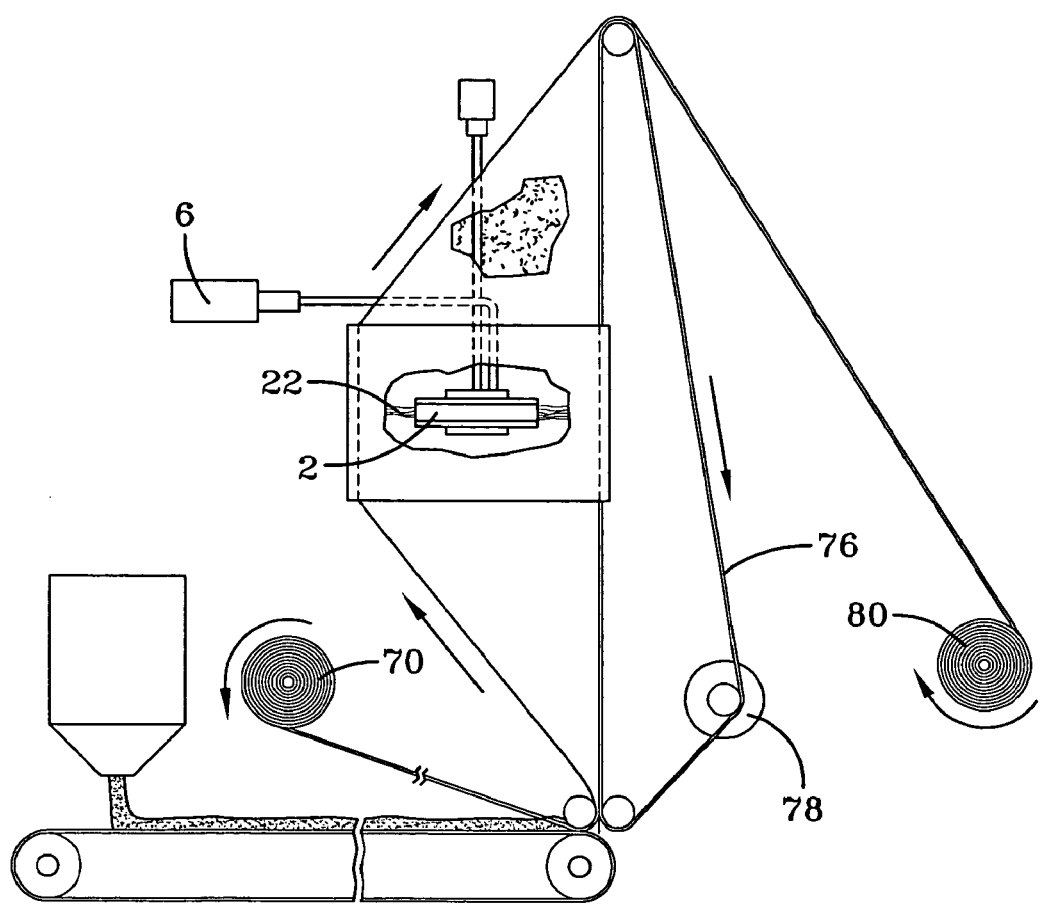
FIG. 11 is a drawing of another embodiment of the takeaway means from the apparatus, this embodiment detailing a continuous takeaway.

Another embodiment involves a continuous belt fiber takeaway. The area described as FIG. 11 details a dual purpose continuous carrier embodiment of the takeaway belts. In such a setup continuous carrier belt 76, moves with or without a substrate 14. Fibers are sprayed onto a supply roll 70, of a material means. The fibers are sprayed onto this means 70, as the substrate passes near the spinning head 2. A continuous carrier belt 76, is powered by a drive motor 78. The continuous carrier belt operating as a loop, requiring no changes or starting/stopping of this belt 76. The substrate of the takeaway means 16, next peels/strips the nonwoven material away 22, and winds the nonwoven material into a roll 80, for storage/use.

The source material used for fiber making can be, but is not limited to glass, polymer or thermoplastic materials. Organic polymer materials made from sugar and corn can be used. In the prototype embodiment, polypropylene was used as the source material. The prototype material was heated and spun under temperature, however it is also possible to cold spin a raw material if the materials chemical properties/makeup allow for flow at room temperature or less than room temperature.

The typical end product created can be, but is not limited to substrates, nonwoven media, geotextiles, insulation and other areas where fiber is the primary end product.

The delivery of the material from the raw material source 6, to the fiber spinning plates 24, can be gravity fed or can be fed under pressure. Such a pressure can be, but is not limited to, 1 to 500 atmospheres. The pressure in the spinning apparatus distribution path and/or the outflow edge 34, can also be at atmospheric pressure or from 1 to 500 atmospheres.

The diameter of spinning head 2, will vary based on application and method of use. The diameter of spinning head 2 being within the range of 0.1" to 145" dia, or within the range of 1.5" to 50" dia, or being with the range of 2.5" to 12" dia. The takeaway tube 18, which envelops the device can be from 0.5" to 200" inside diameter or can be from 3" to 54" inside diameter or can be from 8" to 24" inside diameter. The preferred embodiment utilizing a 3.5" spinning head 2, with a 12" takeaway tube 18. However, many variations are possible on these setups based on the finished product desired. For example for flat goods requiring a 120" sheet a spinning head utilizing a 35" diameter (approximate) is required.

The temperatures of the extrusion will also vary based on application and method of use. The melt and flow point of the material being used will dictate the optimum temperature for extrusion. In one embodiment a temperature of 450 to 500° F. was utilized to properly affect the material flow of polypropylene. As stated previous the heater is used to affect the flow properties of the source materials and is only needed to effect flow, serving no other apparent purpose. Provided the material has the ability to flow at room temperature (or even lower than room temperature) spinning is possible. The only limitation on temperature being the ability of the material to flow in the spinning means.

What is claimed is:

1. A method of spinning fibers comprising the steps of:
providing a material for use in forming fibers;
providing a fiberizer with a spinneret capable of being spun about a shaft comprising one or more stacked, thin circular plates;
providing a housing device containing the one or more plates;
at least one of the plates or the housing unit having a central opening to receive material to be formed into fibers;
at least one of the plates having a groove which defines an outflow edge peripheral to the plate;
the one or more plates and housing unit cooperating to form a chamber for receiving the fiber forming material and to allow the flow of material along a radial path whereby the outflow edge will define a spinneret orifice through which fibers are extruded, and wherein the one or more said plates have holes and are stacked so as to offset adjacent holes in adjacent plates to define a non-linear path;
delivering the material to said spinneret with a rotating means;
moving the material through said spinneret and utilizing the plates so as to define a distribution path;
extruding the material via an outflow edge located on one of the plates and peripheral to the plate; and
collecting the spun fibers.

2. The method of claim 1 where the one or more plates are made by stamping, machining, etching, laser cutting or electrical discharge machining.

3. The method of claim 1 where the one or more plates have a thickness between 0.0005" and 0.1".

4. The method of claim 1 where the non-linear distribution path is created by slotting, etching, laser cutting, scoring or indenting a series of square, rectangular, slotted, semi-circular, or v-shaped grooves in said plates.

5. The method of claim 1 where the distribution path is created by slotting, etching, laser cutting, scoring or indenting a series of square, rectangular, slotted, semi-circular or v-shaped grooves on both sides of the plate.

6. The method of claim 1 where the groove is created by mechanical, electrical or chemical methods.

7. The method of claim 1 where the distribution path has a dimension of 0.0005" to 0.1" height by 0.010" to 1.0" depth by 0.0005" to 0.1" width.

8. The method of claim 1 where the one or more plates are made from ferrous metal, non ferrous metal, aluminum, steel, iron, plastic, inconel or ceramic materials.

9. The method of claim 1 wherein the pressure is from 1 to 500 atmospheres.

10. A method of spinning fibers comprising the steps of:
providing a material for use in forming fibers;
providing a fiberizer with a spinneret capable of being spun about a shaft comprising one or more stacked, thin circular plates, wherein the one or more plates are at an angle of 70 to 89.9 degrees from the axis centerline;
providing a housing device containing the one or more plates;
at least one of the plates or the housing unit having a central opening to receive material to be formed into fibers;
at least one of the plates having a groove which defines an outflow edge peripheral to the plate;
the one or more plates and housing unit cooperating to form a chamber for receiving the fiber forming material and to allow the flow of material along a radial path whereby the outflow edge will define a spinneret orifice through which fibers are extruded, and wherein the one or more said plates have holes and are stacked so as to offset adjacent holes in adjacent plates to define a non-linear path;
delivering the material to said spinneret with a rotating means;
moving the material through said spinneret and utilizing the plates so as to define a distribution path;
extruding the material via an outflow edge located on one of the plates and peripheral to the plate; and
collecting the spun fibers.

11. The method of claim 1 wherein the one or more plates are stacked in such a manner as to offset any hole from the hole of any adjacent plate.

12. A method of spinning fibers comprising the steps of:
providing a material for use in forming fibers;
providing a fiberizer with a spinneret capable of being spun about a shaft comprising one or more stacked, thin circular plates;
providing a housing device containing the one or more plates;
at least one of the plates or the housing unit having a central opening to receive material to be formed into fibers;
at least one of the plates having a groove which defines an outflow edge peripheral to the plate;
the one or more plates and housing unit cooperating to form a chamber for receiving the fiber forming material and to allow the flow of material along a radial path whereby the outflow edge will define a spinneret orifice through which fibers are extruded, and wherein the one or more said plates have holes and are stacked so as to offset adjacent holes in adjacent plates to define a non-linear path;
delivering the material to said spinneret with a rotating means;
moving the material through said spinneret and utilizing the plates so as to define a distribution path;
extruding the material via an outflow edge located on one of the plates and peripheral to the plate;
collecting the spun fibers; and
wherein the plates have a central hole having an inner diameter of varying dimensions, with the plate possessing the largest inner diameter being placed near the material entry and the plate with the smallest inner diameter being the most remote plate relative to the location of the material entry so that the series of holes will define a narrowing opening.

13. The method of claim 1 wherein collecting the spun fibers comprises a continuously fed looped belt system to transport the fibers from the outflow edge to a storage means.

14. The method of claim 1 where the one or more plates are prearranged as an interchangeable module.

15. The method of claim 1 where the one or more plates are disposable.

* * * * *